United States Patent [19]

Nedzu

[11] Patent Number: 5,112,553
[45] Date of Patent: May 12, 1992

[54] IMPROVEMENT IN INJECTION MOLDED ARTICLES HAVING THREE DIMENSIONAL SURFACES

[75] Inventor: Shigeru Nedzu, Shizuoka, Japan

[73] Assignee: Polyplastics Co., Ltd., Osaka, Japan

[21] Appl. No.: 577,127

[22] Filed: Sep. 4, 1990

[30] Foreign Application Priority Data

Sep. 4, 1989 [JP] Japan .................. 1-229080

[51] Int. Cl.⁵ .................. B29C 45/16; B29C 59/02
[52] U.S. Cl. .................. 264/259; 264/265; 264/316; 264/328.1; 264/331.11; 264/331.15; 264/331.19; 264/338; 427/296
[58] Field of Search .......... 264/259, 316, 265, 328.1, 264/331.11, 331.15, 331.19, 338; 249/103, 104; 425/89; 427/296

[56] References Cited

U.S. PATENT DOCUMENTS

| | | | |
|---|---|---|---|
| 3,373,237 | 3/1968 | Mihalik et al. | 264/316 |
| 3,654,062 | 4/1972 | Loew | 264/259 |
| 3,795,471 | 3/1974 | Milani | 264/568 |
| 4,639,341 | 1/1987 | Hanamoto et al. | 264/511 |
| 4,715,919 | 12/1987 | Fakirov et al. | 264/102 |
| 4,795,127 | 1/1989 | Asai | 249/103 |
| 4,892,774 | 1/1990 | Vallance | 264/258 |

FOREIGN PATENT DOCUMENTS 1197727 7/1970 United Kingdom.

OTHER PUBLICATIONS

Patent Abstracts of Japan, vol. 13, No. 244 (M-834)(3592) Jun. 7, 1989.
Patent Abstracts of Japan, vol. 10, No. 163 (M-487)(2219) Jun. 11, 1986.
Patent Abstracts of Japan, vol. 13, No. 237 (M-833)(3585) Jun. 5, 1989.
Patent Abstracts of Japan, vol. 14, No. 395 (M-1016)(4338) Aug. 27, 1990.
Patent Abstracts of Japan, vol. 14, No. 384 (M-1013)(4327) Aug. 20, 1990.
Patent Abstract of Japan, vol. 13, No. 262 (C-608) (3710) Jun. 16, 1989.

*Primary Examiner*—Hubert C. Lorin
*Assistant Examiner*—A. Y. Ortiz
*Attorney, Agent, or Firm*—Nixon & Vanderhye

[57] ABSTRACT

A process for preparing an injection-molded article having a three-dimensional pattern on a surface thereof includes placing a master film of a thermoplastic resin having a three-dimensional master pattern formed on a region thereof into a mold such that the master pattern is exposed to the mold cavity. An injection-moldable resin is then injected into the mold cavity so as to cause a surface region of the resin to conform to the three-dimensional master pattern on the master film, and to thereby transfer the master pattern onto said surface region of the resin. The master film is then removed from the surface region of the injection molded resin to thereby expose said three-dimensional pattern formed thereupon. Preferably the master film is formed of a thermoplastic resin having a melting point greater than the injection molding temperature. Other lower melting point thermoplastic films can be used by metallizing the film's surface so that it withstands the injection molding temperature.

1 Claim, No Drawings

IMPROVEMENT IN INJECTION MOLDED ARTICLES HAVING THREE DIMENSIONAL SURFACES

FIELD OF THE INVENTION

The present invention relates to process for decorating the surface of injection molded articles and to the resulting surface-decorated molded articles thereof. More particularly, the present invention relates to surface-decoration processes by which a three-dimensional pattern/design can be provided on the surfaces of injection molded articles which avoids using engraved molds (i.e., molds whose surfaces have been engraved to form the desired pattern on the resulting molded article) during the injection-molding process.

BACKGROUND AND SUMMARY OF THE INVENTION

The conventional practice for furnishing three-dimensional patterns, including indicia, characters, designs, or combinations thereof (hereinafter collectively referred to as "patterns"), on surfaces of injection molded articles typically comprises using an engraved mold whose surfaces have been carved or engraved to form a reverse pattern image—i.e. a pattern image which is reverse to the pattern ultimately formed on the surface of the injection molded article. However, engraved molds tend to be expensive due to the engraving that is required. In addition, engraved molds usually take a long time to make. These factors usually mitigate against the use of such molds when a small number of molded articles are intended to be produced. Therefore, a more inexpensive and relatively easier process for furnishing three-dimensional surface patterns on injection molded articles has been needed. It is towards satisfying such a need that the present invention is directed.

The present invention relates to processes whereby three-dimensional patterns may be formed on surfaces of injection molded articles. More specifically, the present invention relates to forming three-dimensional patterns on surfaces of injection-molded articles using a master film of thermoplastic resin which has excellent heat-resistance strength and rigidity properties and which is provided with a reverse image of the three-dimensional pattern to be formed on the injection molded article. The three-dimensional pattern on the thermoplastic master film is transferred to the injection molded article by first placing the film in the mold cavity of an injection mold and then injecting molten thermoplastic resin into the mold cavity. In such a manner, the surface of the three-dimensional pattern provided on the master film will come into contact with the molten thermoplastic resin being injected into the mold cavity so that, upon cooling and solidification, the three-dimensional pattern will be formed in the surface of the injection molded article.

These aspects, as well as others, will become more clear after careful consideration is given to the detailed description of the preferred exemplary embodiments thereof which follow.

DETAILED DESCRIPTION OF THE PREFERRED EXEMPLARY EMBODIMENTS

The process of the present invention necessarily employs a master film of thermoplastic resin having a three-dimensional master pattern formed thereon. The thermoplastic resin film with the three-dimensional master pattern is thus first placed in the mold cavity such that the master pattern will be exposed to the molten thermoplastic resin to be injected thereinto.

Although the thermoplastic resin film which may be employed according to the present invention for use in forming the master pattern is not particularly limited in type, it must exhibit excellent heat-resistance, strength and rigidity properties and have a melting point greater than the temperature at which the thermoplastic resin is injected into the mold cavity. That is, the thermoplastic master film should have a melting point that is sufficiently greater than the temperature at which the injection molding process is performed so as to maintain the shape and integrity of the master pattern thereon throughout the injection molding cycle. Thus, as used herein and in the accompanying claims, the term "molding temperature" refers to the temperature of the molten thermoplastic resin at the point whereby it exits the tip of an injection nozzle associated with an injection molding machine and is introduced into the cavity of the injection mold.

Those thermoplastic resins which have a high melting point but which undergo thermocrystallization at the molding temperature which might cause distortion or erasure of the three-dimensional master pattern formed thereon are not suitable for use in the present invention. That is, the films which are usable in accordance with the processes of the present invention must have a melting point greater than the molding temperature and must be of a sufficient crystallinity at the molding temperature.

The three-dimensional pattern may be formed on the surface of the master film simultaneously during film-formation using embossing rolls engraved with the desired three-dimensional pattern to be imparted thereto. It is therefore important that the master film have a high degree of crystallinity when the three-dimensional pattern is formed thereon. That is, it is important according to the present invention that the master film be formed of a resin having a high rate of crystallization, and in this regard, polybutylene terephthalate (PBT) resin film is particularly preferred. Other resins (such as polyethylene terephthalate resin) have too low of a crystallization rate and thus are not highly crystallized at the time the film is formed. As a result, polyethylene terephthalate resin is not suitable for use in the present invention as the master film since either the film itself may become hazy or the three-dimensional pattern thereon could be subjected to distortion or erasure when heated to 120°–160° C.

Since the melting point of a PBT resin film is about 250° C, thermoplastic resins which are injection-molded at 225° C. or below (hereinafter referred to as "low melting point resins), such as polystyrene resins, acrylic resins, acrylonitrile/styrene copolymer resins, acrylonitrile/butadiene/styrene copolymer resins, polyacetal resins, polypropylene resins, polyethylene resins and copolymers thereof provide molded articles having good three-dimensional surface patterns. However, thermoplastic resins which are injection-molded at temperatures of 225° C. or above (hereinafter referred to as "high melting point resins"), for example, polyester resins such as polybutylene terephthalate and polyethylene terephthalate resins, polycarbonate resins, polyarylate resins, polyamide resins, polymethylpentene resins, polypropylene resins, and copolymers thereof are not desirable because the three-dimensional patterns of the master film may be distorted or erased at such elevated temperatures.

Notwithstanding the fact that low melting point resins are preferred for use in forming three-dimensional surface decorated injection molded thermoplastic articles, the present invention also is directed towards a means for allowing high melting point resins to be provided with three-dimensional surface patterns. In this regard, the present invention is further directed towards processes which use high melting point resins which are injection-molded at temperatures greater than about 225° C. using a master film (i.e. a film having a three-dimensional pattern formed thereon) on which a metal layer has been deposited. In other words, high melting point resins may be provided with three-dimensional patterns provided that a metallized thermoplastic film is used as the master film placed in the mold cavity.

According to the present invention, when high melting point resins are employed (i.e. resins having molding temperatures which are equal to or greater than the melting point of the thermoplastic resin forming the master film) as the injection molded resin according to the present invention, it is preferred to use a master film having a three-dimensional film pattern formed thereon and over which a metal layer, such as aluminum, zinc, silver, chromium, nickel or copper, has been deposited thereon. It is particularly preferred from the viewpoint of processability that the deposited metal layer be aluminum.

Notwithstanding the fact that high melting point resins may be employed to form three-dimensional surface patterned thermoplastic injection metal articles according to the present invention, it is still necessary that the master pattern film have sufficiently high crystallinities so as to not undergo significant crystallization at the molding temperature during the injection molding cycle. Although the use of a metallized film is especially preferred, (and in fact necessary) when the injection molded resin is a high melting point resin) the metallized film can, of course, be employed with equally successful results using low melting point resins.

The metallized layer will be exposed to the mold cavity while the thermoplastic film layer is placed in abutting conforming relationship to the mold surface.

Some thermoplastic injection moldable resins, such as polypropylene resins, have a molding temperature that ranges from below to above the melting point of the resin forming the master pattern film due to differences in the molecular structure and/or the manner in which it has been modified, such as via copolymerization, grafting or the like. For example, the melting point of the PBT resin is about 225° C., while the molding temperature of polypropylene resin ranges from about 210° to about 260° C. Thus, for polypropylene resin (and other resins having wide ranges of molding temperatures), the decision of whether or not to use a metallized film is based upon the molding temperature of the particular resin that is employed.

As is well known, polybutylene terephthalate resin can be obtained by polycondensing 1,4-butanediol with terephthalic acid or its ester forming derivatives. Thus, according to the present invention, such a well-known polybutylene terephthalate resin can similarly be employed in the processes according to the present invention. It is also possible to use copolymers which mainly consist of butylene terephthalate structural units and those resins which are formed by modifying butylene terephthalate polymers or copolymers via crosslinkage and the like.

In addition, the PBT resin from which the master film is formed, can include other additives typically employed in thermoplastic resins, for example, stabilizers such as antioxidants and ultraviolet absorbers, plasticizers, anti-static agents, surfactants or crystallization accelerators. Other thermoplastic resins, inorganic fillers and other auxiliary components well known to those in the thermoplastic resin art may be employed in the resin forming the master film used in the processes of the present invention. The use of any additive should, of course, not inhibit the functional attributes necessarily required of the master pattern film used in the processes of the present invention as described above.

Although the thickness of the master film is not especially limited, excessively thin films may break or tear during the injection molding cycle. On the other hand, excessively thick films cannot usually be caused to evenly adhere to the interior surfaces of an injection mold thereby sometimes resulting in a failure to obtain a molded article of the desired dimensional accuracy. The thickness of the master film is thus desirably between about 30 to about 155 $\mu$m and more preferably, between about 50 to about 100 $\mu$m. The master film may also be single layer film or may be a multi-layer laminated film, provided that it has a three-dimensional pattern formed thereon.

The temperature of the mold in which the master film is placed is preferably between 50° to 150° C. so that adhesion of the injected resin to the master pattern film is obtained. Preferably, the mold temperature is between about 60° to about 100° C. With the master film properly positioned within the mold cavity (i.e. on the surface of the mold), molten thermoplastic resin may then be injected into the mold cavity so as to completely fill the same. The molten thermoplastic resin injected into the mold cavity will thus flow around the three-dimensional pattern formed on the master pattern film such that its pattern is transferred to the injection molded article upon solidification.

The thermoplastic resin injection molded article having a three-dimensional surface pattern formed thereon according to the process of the present invention thus enhances the overall surface finish of the molded article. In addition, the process of the present invention is advantageous in that various three-dimensional patterns can be provided on surfaces of injection molded articles in a more simplified manner and at a lower cost using a single "smooth" mold. It is thus now possible to produce, at lower costs and in a more simplified manner, injection molded articles having various surface decorations using a single mold simply by providing master films having the desired three-dimensional surface patterns previously formed thereon. Virtually any injection-moldable thermoplastic resin can thus be used according to the present invention as described above so that the field in which three-dimensional surface-decorated injection molded articles are used can be expanded.

EXAMPLES

The present invention will now be described in detail with reference to the following nonlimiting Examples.

Examples 1 to 6 and Comparative Examples 1 to 4

A three-dimensional pattern was transferred to a surface of a flat plate (100 mm × 100 mm × 3 mm) under the molding conditions as specified in Table 1 using a polybutylene terephthalate resin master pattern film (thickness of 70 μm and melting point of 225° C.) which was previously formed with a three-dimensional pattern. Polystyrene resin (PS resin) or an acrylonitrile-/butadiene/styrene copolymer resin (ABS resin) was used as the thermoplastic resin that was injection-molded.

Evaluation was made according to the following criteria, and Table 1 gives the results of that evaluation.

The three-dimensional pattern of the master pattern film was compared with that transferred to the molding to evaluate the extent of distortion.

○: good, no distortion
Δ: rather good, slight distortion
x : bad, marked distortion Examples 7 to 10 and Comparative Examples 5 to 8

The same evaluation as that of Examples 1 to 6 was made by using a film (thickness of 80 μm) composed of three layers of a polyethylene terephthalate resin film, a polybutylene terephthalate resin film and an intermediate layer comprising an adhesive and having a three-dimensional pattern previously formed on the surface of a polybutylene terephthalate resin master pattern film. Polystyrene resin, ABS resin, polybutylene terephthalate resin or a polyethylene terephthalate resin were employed as the thermoplastic resin to be injection-molded. Table 1 provides the results.

Examples 11 to 20

A three-dimensional pattern was transferred to one surface of a flat plate (100 mm × 100 mm × 3 mm) under the molding conditions as specified in Table 1 using a polybutylene terephthalate resin master pattern film (thickness of 80 μm) previously furnished with a three-dimensional pattern coated with a vacuum-evaporated aluminum deposited thereon. Polystyrene resin, polybutylene terephthalate resin or polyethylene terephthalate resin were used as the thermoplastic injection molding resins.

Evaluation was made according to the same criteria as those of Examples 1 to 6. Table 1 gives the results of that evaluation.

TABLE 1

| | Molding conditions | | | | | |
|---|---|---|---|---|---|---|
| | mold temp. (°C.) | resin temp. (°C.) | Injection molding material | Film structure | Film thickness (μm) | Results of evaluation |
| Ex. No. | | | | | | |
| 1 | 60 | 190 | PS resin | single PBT layer | 70 | ○ |
| 2 | 60 | 205 | " | " | " | ○ |
| 3 | 60 | 220 | " | " | " | ○ |
| 4 | 70 | 190 | ABS resin | " | " | ○ |
| 5 | 70 | 205 | " | " | " | ○ |
| 6 | 70 | 220 | " | " | " | ○ |
| 7 | 60 | 205 | PS resin | PBT/adhesive/PET | 80 | ○ |
| 8 | 60 | 220 | " | " | " | ○ |
| 9 | 70 | 205 | ABS resin | " | " | ○ |
| 10 | 70 | 220 | " | " | " | ○ |
| 11 | 60 | 190 | PS resin | Al-metallized PBT | " | ○ |
| 12 | 60 | 225 | " | " | " | ○ |
| 13 | 60 | 250 | " | " | " | ○ |
| 14 | 60 | 240 | PBT resin | " | " | ○ |
| 15 | 60 | 250 | " | " | " | ○ |
| 16 | 60 | 260 | " | " | " | ○ |
| 17 | 70 | 250 | " | " | " | ○ |
| 18 | 70 | 260 | " | " | " | ○ |
| 19 | 100 | 260 | PET resin | " | " | ○ |
| 20 | 100 | 270 | " | " | " | ○ |
| Comp. Ex. No. | | | | | | |
| 1 | 60 | 235 | PS resin | single PBT layer | 70 | Δ |
| 2 | 60 | 250 | " | " | " | X |
| 3 | 70 | 235 | ABS resin | " | " | Δ |
| 4 | 70 | 250 | " | " | " | X |
| 5 | 60 | 245 | PBT resin | PBT/adhesive/PET | 80 | Δ |
| 6 | 60 | 260 | " | " | " | X |
| 7 | 70 | 260 | PET resin | " | " | X |
| 8 | 70 | 270 | " | " | " | X |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for preparing an improved injection-molded article having a three-dimensional undistorted pattern on a surface thereof, comprising the steps of:
   placing a master film of a thermoplastic resin having a three-dimensional master pattern formed on a region thereof into a mold such that the master pattern is exposed to the mold cavity;
   injecting an injection-moldable resin selected from the group consisting of polybutylene terephthalate resins, polyethylene terephthalate resin, polycarbonate resins, polyarylate resins, polyamide resins, polymethylpentene resins, polypropylene resins, and copolymers thereof at an injection molding temperature into the mold cavity so as to cause a surface region of the resin to conform to the three-dimensional master pattern on the master film, and to thereby transfer the master pattern onto said surface region of the resin; and then
   removing said master film from the surface region of the injection molded resin to thereby expose said three-dimensional pattern formed thereupon, wherein said step of placing a master film of a thermoplastic resin includes the step of selecting a composite film having a film layer which consists essentially of a crystalline thermoplastic polybutylene terephthalate resin having a melting point lower than the injection molding temperature, and a protective evaporated metal layer, which is at least one metal selected from the group consisting of aluminum, zinc, silver, chromium, nickel and copper, deposited upon and covering one surface of said film layer, and wherein distortion of the pattern on the surface of the injection molded article is prevented by said composite film being placed within said mold cavity such that said thermoplastic resin film layer is adjacent walls forming said mold cavity with the metal layer being exposed to said mold cavity and thereby in contact with said injection-moldable resin injected into said mold cavity.

* * * * *

UNITED STATES PATENT AND TRADEMARK OFFICE
CERTIFICATE OF CORRECTION

PATENT NO. : 5,112,553

DATED : May 12, 1992

INVENTOR(S) : NEDZU

It is certified that error appears in the above-identified patent and that said Letters Patent is hereby corrected as shown below:

Column 3, line 40, after "resin" (second occurrence), delete the parenthesis (()) and insert a comma (,).

Signed and Sealed this

Third Day of August, 1993

Attest:

MICHAEL K. KIRK

Attesting Officer    Acting Commissioner of Patents and Trademarks